United States Patent
Taubman et al.

(10) Patent No.: US 6,297,851 B1
(45) Date of Patent: Oct. 2, 2001

(54) ANALOG VIDEO FRAME CAPTURE AND PREVIEW

(75) Inventors: David S. Taubman, Redwood City; Andrew J. Patti, Mountain View, both of CA (US)

(73) Assignee: Hewlett-Packard Co, Palo Alto, CA (US)

( * ) Notice: Subject to any disclaimer, the term of this patent is extended or adjusted under 35 U.S.C. 154(b) by 0 days.

(21) Appl. No.: 08/896,006

(22) Filed: Jul. 17, 1997

(51) Int. Cl.[7] .............................. H04N 7/00; H04N 5/44; H03M 1/12; G06F 13/00

(52) U.S. Cl. ..................... 348/572; 348/572; 348/559; 348/552; 348/722; 345/327; 345/328; 386/45; 386/52; 386/55; 386/60

(58) Field of Search ..................... 348/572, 559, 348/552, 715, 722, 578, 580, 581, 582–583, 576, 561, 716; 345/327, 328; 386/45, 4, 52, 55, 64, 69, 70, 125, 126; 358/445, 443, 409, 296, 446

(56) References Cited

U.S. PATENT DOCUMENTS

| | | | |
|---|---|---|---|
| 4,614,196 | * | 9/1986 | Sato ........................................ 348/163 |
| 4,685,003 | * | 8/1987 | Westland ................................. 386/52 |
| 4,751,583 | * | 6/1988 | Levine .................................... 358/256 |
| 4,855,813 | * | 8/1989 | Russel et al. ........................... 348/559 |
| 4,998,215 | | 3/1991 | Black et al. ............................. 364/519 |
| 5,028,993 | * | 7/1991 | Kobori et al. .......................... 358/78 |
| 5,045,951 | | 9/1991 | Kimura et al. ......................... 358/445 |
| 5,109,281 | * | 4/1992 | Kobori et al. .......................... 358/296 |
| 5,121,476 | * | 6/1992 | Yee ........................................ 348/559 |
| 5,138,503 | * | 8/1992 | Nishida .................................. 386/120 |
| 5,150,200 | * | 9/1992 | Hong ...................................... 348/559 |
| 5,251,074 | * | 10/1993 | Hamma et al. ....................... 360/10.1 |
| 5,452,093 | * | 9/1995 | Kwak ..................................... 358/296 |
| 5,485,553 | * | 1/1996 | Kovalick et al. ...................... 395/106 |
| 5,537,528 | * | 7/1996 | Takahashi et al. .................... 345/302 |
| 5,579,116 | * | 11/1996 | Sugiyama et al. .................... 358/296 |
| 5,732,184 | * | 3/1998 | Chao et al. ............................ 386/55 |
| 5,929,933 | * | 7/1999 | Takeuchi ............................... 348/581 |

FOREIGN PATENT DOCUMENTS 0105642   4/1984   (EP) .

OTHER PUBLICATIONS

European Search Report, Application No.: EP 98 30 4715, dated Sep. 29, 1999.

* cited by examiner

*Primary Examiner*—Reinhard J. Eisenzopf
*Assistant Examiner*—Paulos Natnael (57) ABSTRACT

A method and system for capturing analog video data and previewing still video images of the captured analog video data without converting the analog video data into digital image data. The system takes analog video data and converts the data into raw digitized video data. The raw digitized video data is stored in a memory until the data is selected for previewing. Once selected, the raw digitized video data is reconverted into analog video data that presents a still image of the desired data. The system is also able to discard unnecessary portions of the raw digitized video data and store only necessary portions of the raw digitized video data. Preferably, the video capture, preview, and storage technique is used in video printing. When used in video printing, the raw digitized video data is converted into digital image data using a software decoding process.

13 Claims, 5 Drawing Sheets

ANALOG VIDEO FRAME CAPTURE AND PREVIEW

TECHNICAL FIELD

The invention relates generally to capturing and viewing analog video data. More particularly, the invention relates to capturing and viewing still images of analog video data in a video printing system.

BACKGROUND ART

Video data is typically provided in one of two formats, composite video or S-video. Composite video is a video signal in which the luminance (brightness), chrominance (color), vertical blanking information, horizontal sync information, and color burst information are presented on a single channel according to a particular coding standard. S-video, or separated video, is a higher quality video delivery system in which the luminance, vertical blanking information, and horizontal sync information are carried on one channel and the chrominance and color burst information are carried on another channel. The different coding standards for composite video and S-video include the National Televison Standards Committee (NTSC) standards, the Phase Alternate Line (PAL) system, and the Sequential Couleur A'manorie (SECAM) standard.

Under NTSC standards, one frame of video data contains two fields of video data. One frame of video data has 525 horizontal lines of information with each of the two fields having 262.5 horizontal lines of information. The horizontal lines of information are scanned onto a monitor, such as a television set, at a rate of 30 frames per second.

The prior art of video capture and preview requires video data to go through multiple processing steps during capture and preview. The first step in video capture and preview is the conversion of an analog video signal into raw digitized video samples and then the conversion of raw digitized video samples into digital image data. Raw digitized video samples consist of digitized values of the analog signal. Digital image data consists of data that has been decoded into color pixel values.

After the analog video signal has been converted into digital image data, the digital image data is either immediately transferred for preview or stored in memory until it is called on for previewing. Digital image data that is selected for previewing is reconverted from digital image data to analog video data and then displayed on a monitor. Existing video capture and display devices accomplish the conversion and reconversion of analog video data and digital image data with the aid of general purpose video decoding and encoding chip-sets. The chip-sets perform the necessary timing recovery, luminance/chrominance separation and chrominance demodulation tasks in real-time.

Video capture and preview techniques are often applied to video printing. Video printing is a technique whereby a still image is printed from motion video such as a VHS tape. In video printing, a video is viewed by a user. Once an image of interest is identified, a still video image is created for previewing on a monitor. Creating the still video image involves converting corresponding digital image data into an analog video signal. The user then previews the still video image and directs the image to be printed if the image is desired. Once selected, the digital image data that corresponds to the still video image is transferred to a printer for printing.

Prior art in video printing is disclosed in U.S. Pat. No. 5,045,951 to Kimura et al. and U.S. Pat. No. 4,998,215 to Black et al. In Kimura et al. a video signal processor and a video signal processing method for a video printer are disclosed. Fundamental to the invention is an initial analog-to-digital conversion of the original analog video signal. The digital data output from the analog-to-digital convertor, according to Kimura et al., is pixel data. As stated above, pixel data is data that is in a format that computers recognize as image data. That is, no additional conversion of the pixel data is necessary before printing. But, in order to preview the data that has been selected for printing, the pixel data must be reconverted into an analog signal that can be displayed on a monitor. The reconversion requires additional hardware and processing.

In Black et al. a method and apparatus for converting video information for printing by a standard printer are disclosed. The first process in the invention is an analog-to-digital conversion. The analog-to-digital convertor converts an analog video signal into display dots, or pixel data. The pixel data is in a standard graphics format that is compatible with a standard printer. But, if a user wants to preview the still image before it is printed, the pixel data must first be reconverted into an analog video signal that is compatible with a video monitor.

While the prior art techniques for video capture and preview work well for their intended purpose, there are limitations. For example, the conversions from analog video data to digital image data and back to analog video data for previewing can cause loss of picture quality. Also, 100% of the digital image data must be stored in memory for potential previewing or printing. The storage requirements can quickly overload storage capacity. In addition, the chip-sets required to perform analog-to-digital and digital-to-analog conversions have a relatively high cost.

What is needed is a method and system for previewing a still video image without first having to convert an analog video signal into digital image data and then having to reconvert the digital image data back into an analog video signal representative of the desired still video image. In addition, what is needed is a way to store video signals so that memory space is effectively utilized while data integrity is kept intact.

SUMMARY OF THE INVENTION

The invention is a method and system for capturing analog video data and previewing still video images of the captured analog video data without converting the analog video data into digital image data. In the invention, an analog video signal is generated from an analog video signal source, such as a video cassette player. The analog video signal is continu- ously received through an input that is connected to a first convertor. The convertor converts the analog video signal into raw digitized video data, instead of converting the analog video signal into completely decoded digital image data.

The raw digitized video data is stored in a memory until the image is selected for preview. In order to select an image for preview, the analog video signal is delivered to a display monitor simultaneously with the conversion of the analog video data into raw digitized video data. A user viewing the display monitor selects an image of the video that the user would like to view as a still video image. The raw digitized video data that corresponds to the desired still video image is then reconverted from raw digitized video data into an analog video signal. The still video image may be viewed on a field-by-field basis or a frame-by-frame basis. To create the still video image, the raw digitized video data is processed by a second convertor. The reconversion from raw digitized video data into an analog video signal that represents a still video image requires some special manipulation. Specifically, the phase of the color sub-carrier frequency portion of the analog video signal must be adjusted to account for the phase advance that occurs in the original signal. Once the analog video signal is recreated, the analog video signal is transmitted and displayed, as a still video image, on a display monitor.

There are many advantages to the described approach over the conventional approach of using general purpose video decoding and encod- ing chip-sets to immediately convert an incoming analog video signal into digitized image data. One advantage is that the disclosed approach does not require the use of general purpose video decoding and encoding chip-sets. The chip-sets add additional cost to an analog video capture and preview system. Another advantage is that the disclosed approach allows the user to retain as much knowledge about the original video data as possible by storing the raw digitized video data in memory. Additionally, access to the raw digitized video data allows for advanced decoding and enhancement processing.

Another embodiment of the invention allows the selective storage of raw digitized video data that is generated from an analog video signal. The selective storage approach is different for composite video and S-video. Composite video consists of a relatively high bandwidth baseband signal and a narrow-band signal centered at the color sub-carrier frequency ($F_{sc}$). To convert the analog composite video signal into raw digitized video data, the analog composite video signal is typically sampled at a rate of four times the color sub-carrier frequency. A large amount of sample data that reflects the vertical blanking information, horizontal sync information, hori- zontal blanking information, and color burst information of the analog video signal is generated. Most of the samples that represent the vertical blanking, horizontal blanking, horizontal sync, and color burst information do not need to be stored. The samples can be discarded and synthesized later on an as-needed basis. In a composite video signal, approximately 20% of the raw digitized video samples can be discarded.

With S-video, the selective storage approach is similar, except that the determination of what samples must be stored and what samples can be discarded is more involved. With S-video, there are two channels of raw digitized video samples. One channel is for the Y signal and contains all luminance and horizontal sync and vertical and horizontal blanking information. The other channel is for the C signal and contains the color burst and modulated chrominance information. Both of the signals are sampled at four times the sub-carrier frequency sampling rate (4 $F_{sc}$). The Y channel samples are selectively stored in the same manner as described above for a composite video signal. The C channel, on the other hand, contains much more redundant information, primarily because the modulated chrominance and color burst information occupy only a narrow portion of the frequency spectrum, centered about the sub-carrier frequency. Thus, no more than one in every four of the initial sequences of chrominance samples must be retained. In addition, the samples are retained in a non-uniform manner. The sample discard strategy for S-video is able to reduce memory storage requirements by up to 47%.

In the preferred embodiment, the invention is implemented in a video printing system. A video printing system includes a conversion-and-storage device, a previewing monitor device, a software decoder, and a printing device. The conversion device converts the analog video signal into raw digitized video data. Selected parts of the raw digitized video data are then stored in memory. Raw digitized video data that corresponds to a desired still video image is then reconverted into still video image analog data for previewing on a previewing monitor. Once a satisfactory still video image has been identified for printing, the software decoder uses software algorithms to convert the corresponding raw digitized video data into digital image data that can be recognized by a printing device. The printing device then uses the digital image data to print a still image.

DETAILED DESCRIPTION

Figure 1:
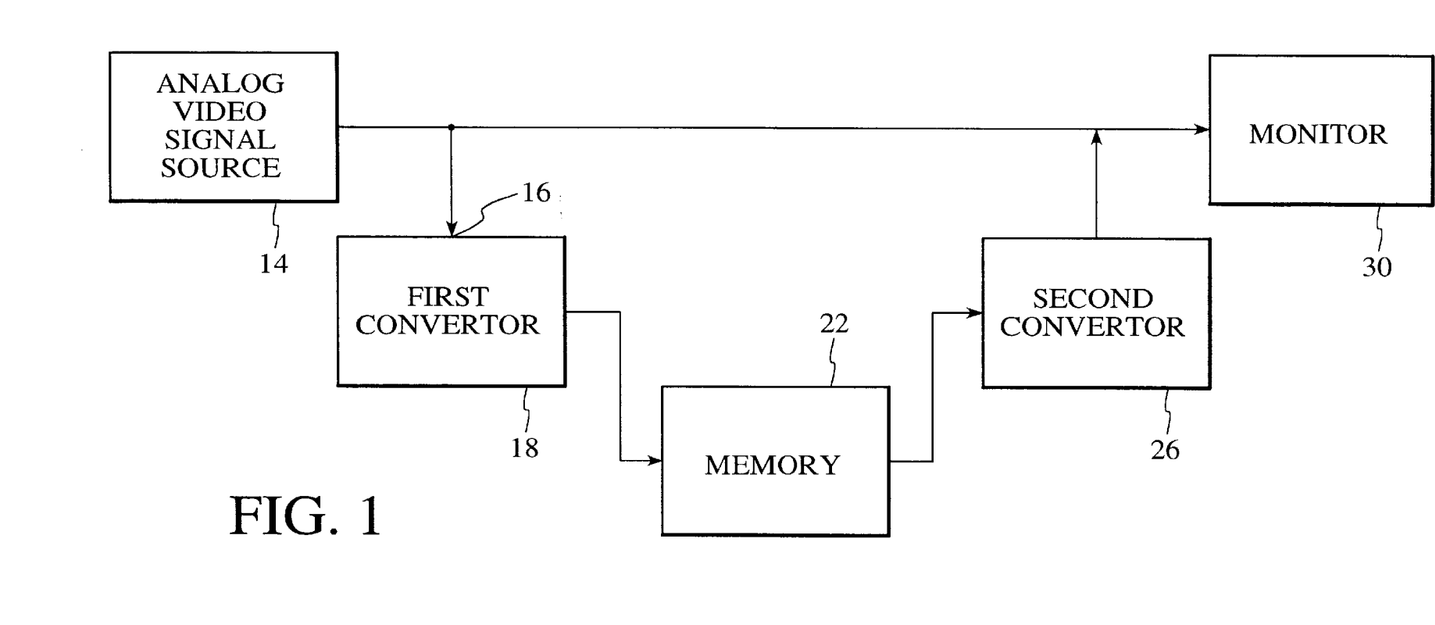
FIG. 1 is a schematic of a video capture-and-preview system in accordance with the invention.
Figure 2:
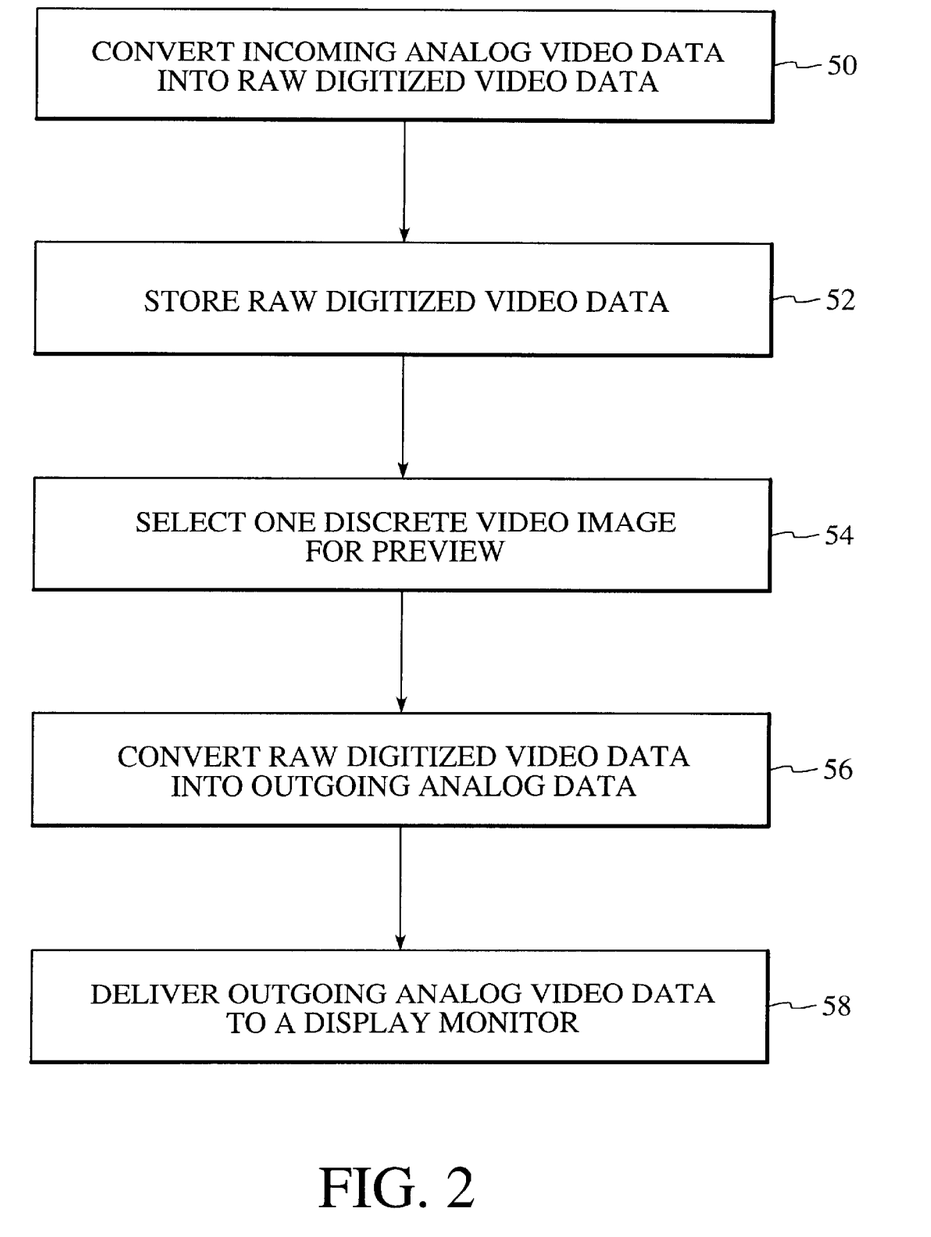
FIG. 2 is a functional block diagram of the video capture-and-preview system in accordance with the invention.

In the invention, referring to FIGS. 1 and 2, an analog video signal is generated from an analog video signal source 14, such as a video cassette player. The analog video signal is continuously received through an input 16 that is connected to a first convertor 18. The convertor converts 50 the incoming analog video signal into a series of raw digitized video data instead of converting the analog video signal into completely decoded digital image data.

Raw digitized video data is simply a digital version of an analog video signal. That is, the raw digitized data is made up of discrete samples that are taken at intervals that are short enough, when compared to the frequency of the sampled analog signal, to create an accurate representation of the sampled analog signal. The raw digitized video data must be further decoded to create digital image data that contains complete pixel data.

The raw digitized video data is stored 52 in a memory 22 until the corresponding image is selected for preview. In order to select an image for preview, the analog video signal is delivered to a display monitor 30 simultaneously with the conversion of the analog video data into raw digitized video data. A user viewing the display monitor selects 54 an image of the video that the user would like to view as a still video image. The raw digitized video data that corresponds to the desired still video image is then reconverted 56 from raw digitized video data into an analog video signal. The analog signal is then delivered 58 to the display monitor and the desired still video image is displayed for previewing on the monitor. The still video image may be viewed on a field-by-field basis or a frame-by-frame basis.

To create a still video image on a field-by-field basis or a frame-by-frame basis, the digitized video data is first processed by a second convertor 26. The reconversion from raw digitized video data into an analog video signal that represents a still image must take into account the fact that NTSC and PAL encoding differ slightly from field-to-field and frame-to-frame. The encoding of NTSC differs with a periodicity of four fields, and the encoding of PAL differs with a periodicity of eight fields.

In NTSC, both the chrominance sub-carrier and color burst signals advance in phase by ¼ of the sub-carrier clock period ($T_{sc}$), between successive fields, relative to the horizontal sync and baseband signals. In order to synthesize the phase advance, the recorded composite video samples in memory must be delayed by $-¼ T_{sc}$ (−1 sample period) to generate field 2 from field 1, by $-½ T_{sc}$ (−2 sample periods) to generate field 3 from field 1 and by $+¼ T_{sc}$ (1 sample period) to generate field 4 from field 1. In this way, precise sub-carrier timing is synthesized while introducing a jitter of up to ½ $T_{sc}$. One-half $T_{sc}$ is equal to 140 nanoseconds in the field-to-field horizontal sync timing. Although the ½ $T_{sc}$ jitter results in a composite signal which does not satisfy broadcast NTSC specifications, the jitter is considerably smaller than that introduced in typical VCR decks.

In PAL, the situation is similar, except that the sub-carrier phase change is ⅜ $T_{sc}$ between successive fields. Therefore, the stored samples must be shifted by integer multiples of ½ the 4 $F_{sc}$ clock period. The simplest way to achieve such shifts is to alternate the clock edge on which samples are transferred to the digital-to-analog convertor in successive fields.

The above discussion applies to a situation where the sampling clock is tightly phase locked to the color sub-carrier. In some implementations, an asynchronous sampling clock that is not phase locked to the color sub-carrier may be used. In this case, the above strategy for delaying the clock in order to synthesize the appropriate shift to the sub-carrier is insufficient to ensure that the display device receives a stable sub-carrier signal. In particular, the display device will generally observe a sharp phase shift in the color sub-carrier signal at each field boundary. The sharp phase shift may adversely affect the display device's ability to lock to the correct sub-carrier waveform, and hence decrease the quality of the image displayed.

One way to correct the phase shift problem, when using an asynchronous clock, is to bring the phase of the display device's internal sub-carrier reference gradually into line with the phase of the actual subcarrier signal to be previewed. This can be accomplished by generating appropriate color burst information during the vertical blanking periods. Color burst information can be generated during the vertical blanking period by extracting recorded color burst samples from previous lines in the field using an appropriate algorithm. An appropriate algorithm for NTSC signals is to extract color burst information from a line in the field based on the ratio between the number of lines in which a color burst signal appears during the vertical blanking period and the number of active lines in the field.

As an example, consider the case of an NTSC signal for which the number of active lines is 240 and the vertical blanking period consists of either 22 or 23 lines (depending upon the field), of which all but nine require color burst information. The first vertical blanking line which requires color burst blanking information would obtain this information from line 212 of the active recorded video signal. The second would obtain its color burst signal from line 194, and so on. As stated above, the displayed color burst information walks backwards through the field and the forward advance in the phase of the sampling clock with respect to the color sub-carrier is undone.

Previewing analog video data without first converting the data into digital image data does not preclude the implementation of some additional preview features. The first additional feature is the ability to overlay text messages onto the video data that is displayed on a preview monitor to guide a user through decisions which may need to be made in order to further manipulate the video data. The feature may readily be introduced with no modifications to the preview system. Software is used to write textual information over the stored raw digitized video data in memory. A backup copy of the stored raw digitized video data is kept in memory for future utilization. If the text overlays are small, the approach will require only a small amount of additional memory. Moreover, the textual overlays may be created during the vertical blanking period while the preview circuitry is not accessing the memory.

A second preview feature is the ability to interactively adjust the color appearance, referred to as saturation or hue, of the preview image interactively. If the raw digitized video data in memory was captured from an S-video source, then saturation adjustment may be accomplished simply by scaling the chrominance samples, which may be accomplished non-destructively by hardware in real time. A hue shift may be accomplished with sufficient accuracy for preview purposes by applying appropriate 2×2 rotation matrices to adjust adjacent pairs of chrominance samples.

Unfortunately, no simple non-destructive approach for color adjustment exists when the samples in memory were captured from a composite video source. However, if software decoding is eventually going to be used, the first task of the software decoding process involves separation of the luminance and chrominance components of a composite video signal. The process essentially produces an S-video signal. By performing the software task immediately after the user has selected the field or frame that the user wishes to print, the saturation adjustment feature discussed above for S-video may be made available after a brief period for processing. Considering that the most numerically complex tasks associated with software decoding are those of time-base recovery and resampling, conversion from composite to S-video representation should not require more than a second or two, depending upon processor performance.

While the decoding is in progress, the memory bandwidth should be dedicated entirely to the processor. The preview monitor can be driven with a synthesized video signal during the decoding.

Another embodiment of the invention allows the selective storage of the raw digitized video data that is generated from the analog video signal. The selective storage approach is different for composite video and S-video. The following is a description of the process used to determine what sample data, otherwise referred to as raw digitized video data, may be discarded from a sampled analog video signal prior to storage.

Figure 3:
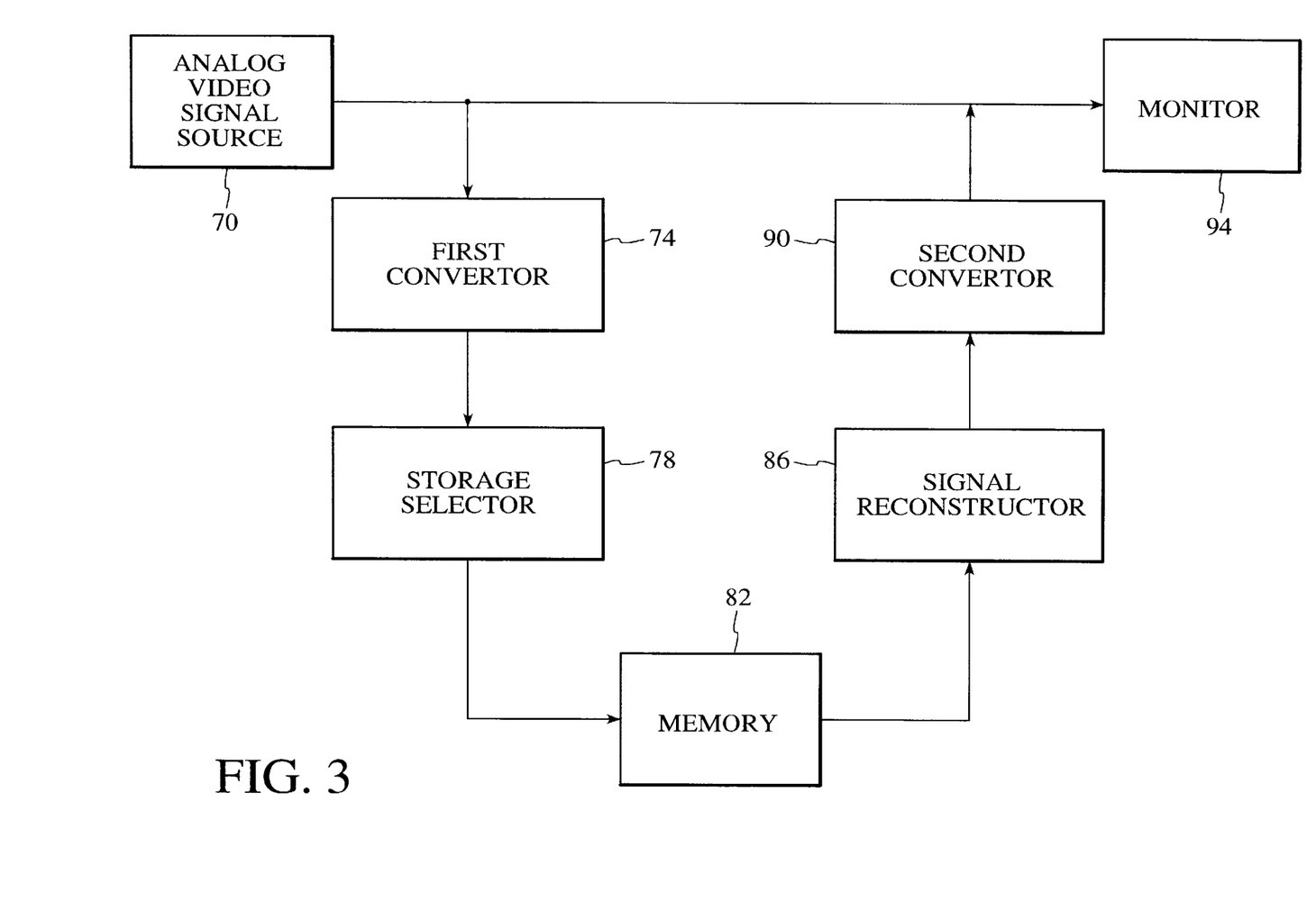
FIG. 3 is a schematic of a video capture-and-preview system with selective storage capability in accordance with the invention.

With reference to FIG. 3, a composite video signal is considered first. Composite video is transmitted on a single channel from an analog video signal source 70. The composite video signal consists of a baseband signal with one frequency and a color sub-carrier signal with a different color sub-carrier frequency. To convert the analog composite video signal into raw digitized video data, the analog composite video signal is typically sampled in the first convertor 74 at a rate of four times the color sub-carrier frequency ($F_{sc}$). A large amount of sample data, that reflects the vertical blanking information, the horizontal sync information, the horizontal blanking information, and the color burst information of the analog video signal, is generated.

The data samples are then transmitted to the storage selector 78. The selective storage process begins by identifying the most important part of the composite video signal. The most important part of the composite video signal is the active region. The active region of the signal is that portion of the signal which is actually displayed on a monitor, such as a television. At the sampling rate of 4 $F_{sc}$, an NTSC signal offers 768 active digitized video samples on each horizontal line, with about 240 horizontal lines per field. Thus, each field contains 184,320 active samples. The total amount of samples in a field is determined by dividing the number of samples per second by the number of fields per second:

$$\frac{14.31818 \times 10^6 \frac{\text{samples}}{\text{sec.}}}{60 \frac{\text{fields}}{\text{sec.}}} = 238,636 \frac{\text{samples}}{\text{field}}.$$

All of the samples from the active region are selected for storage in a memory 82. In addition to the samples from the active region of each field, samples that contain relevant timing information are selected for storage. Specifically, samples from around the leading horizontal sync edges and some or all of the color burst samples are preserved. The remaining horizontal sync samples are discarded and the precise position of the leading horizontal sync edges can be determined later as needed from the small number of samples which were retained. If the sampling clock is locked to the color sub-frequency, there is no need to retain the color burst samples. Altogether, the timing-related information may contribute somewhere between 10 and 50 additional samples to each horizontal line. As a result, each field would contain between 187×10³ and 196×10³ samples per field out of a potential of 239×10³ total samples per field.

In the above discussion of selective storage for composite video sources, it is assumed that the storage selector 78 is able to identify the active video samples and the associated horizontal sync and color burst samples on each line. To this end, circuitry must be provided to approximately locate the leading edge of each horizontal sync pulse and to identify the vertical blanking and synchronization regions of the signal. Once the horizontal sync locations are known to within one or two digitized samples, the color burst and active video regions can also be deduced to similar accuracy. Simple techniques for obtaining such crude estimates of the synchronization pulse locations are well known and not discussed further. It is important to note that accurate synchronization information is not available until future software decoding. Consequently, all preview operations must operate without precise synchronization information. This presents no difficulty, since preview is accomplished simply by replaying stored samples, including those samples recorded from the neighborhood of the leading horizontal sync edges.

With S-video, the selective storage approach is similar, except that the determination of what samples must be stored and what samples can be discarded is more involved. With S-video, there are two channels of raw digitized video samples. One channel is for the Y signal and contains all luminance and horizontal and vertical timing information. The other channel is for the C signal and contains the color burst and modulated chrominance information. Both of these signals are sampled at four times the sub-carrier frequency (4 $F_{sc}$). The Y channel samples are selectively stored in the manner as described above for a composite video signal, with the exception that any retained color burst samples are obtained from the C channel. The C channel, on the other hand, contains much more redundant information, primarily because the modulated chrominance and color burst information occupy only a narrow portion of the frequency spectrum, centered about the sub-carrier frequency. The sub-carrier frequency for an NTSC signal is 3.5795 MHz. The chrominance signal, C(t), has the general form:

$$C(t) = I(t)\cos\left(2\pi F_{sc}t + \frac{\pi}{6}\right) + Q(t)\sin\left(2\pi F_{sc}t + \frac{\pi}{6}\right).$$

where I(t) and Q(t) represent the baseband chrominance signals. Although not strictly necessary, it is convenient to assume that the sampling clock is locked to the sub-carrier waveform such that the n'th sample occurs at time $$t = \frac{n}{4F_{sc}} - \frac{1}{12F_{sc}}.$$

In this case, the chrominance samples, C[n], satisfy $$C[n] = C\left(\frac{n}{F_{sc}} - \frac{1}{12F_{sc}}\right)$$

$$= \begin{cases} I\left(\frac{n}{4F_{sc}} - \frac{1}{12F_{sc}}\right), & n \bmod 4 = 0 \\ Q\left(\frac{n}{4F_{sc}} - \frac{1}{12F_{sc}}\right), & n \bmod 4 = 1 \\ -I\left(\frac{n}{4F_{sc}} - \frac{1}{12F_{sc}}\right), & n \bmod 4 = 2 \\ -Q\left(\frac{n}{4F_{sc}} - \frac{1}{12F_{sc}}\right), & n \bmod 4 = 3 \end{cases}$$

$$= \begin{cases} I\left[\frac{n}{2}\right], & n \bmod 4 = 0 \\ Q\left[\frac{n-1}{2}\right], & n \bmod 4 = 1 \\ -I\left[\frac{n}{2}\right], & n \bmod 4 = 2 \\ -Q\left[\frac{n-1}{2}\right], & n \bmod 4 = 3. \end{cases}$$

Thus, up to a simple sign change, there are two interleaved $2F_{sc}$ samplings of the baseband chrominance signals I(t) and Q(t), namely I[n] and Q[n]. The baseband signals typically have a bandwidth of no more than ±0.6 MHz, suggesting that I(t) and Q(t) may be sampled at a rate of $F^{sc}/2$ or even less without violating Nyquist's sampling criterion. Therefore, no more than one in every four of the initial sequence of chrominance samples, C[n], must be selected for storage in memory. Specifically, only the samples, 1[4n] =C[8n], and Q[4n+2]=C[8n+5] need to be stored. The selective storage approach constitutes a necessarily non-uniform decimation of the original sequence, C[n].

Figure 4:
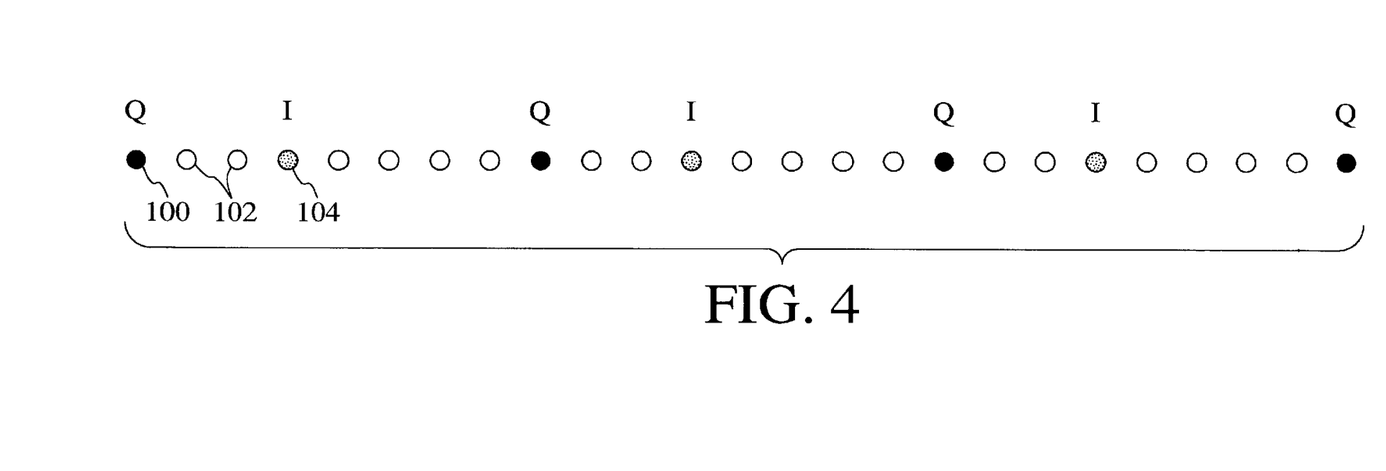
FIG. 4 is a schematic of the sampling pattern for the active region of a chrominance (C) channel of an S-video source in accordance with the invention.

Referring to FIG. 4, the dots represent the sampling pattern of the chrominance channel. The filled dots 100 indicate samples that correspond to the baseband Q chrominance signal, while the shaded dots 104 indicate samples that correspond to the baseband I chrominance signal. The unshaded dots 102 indicate samples which are not necessary for storage. Since chrominance samples are only stored during the active portion of the video signal, the efficiently sampled C channel contributes only 46×10³ samples per video field.

Figure 5:
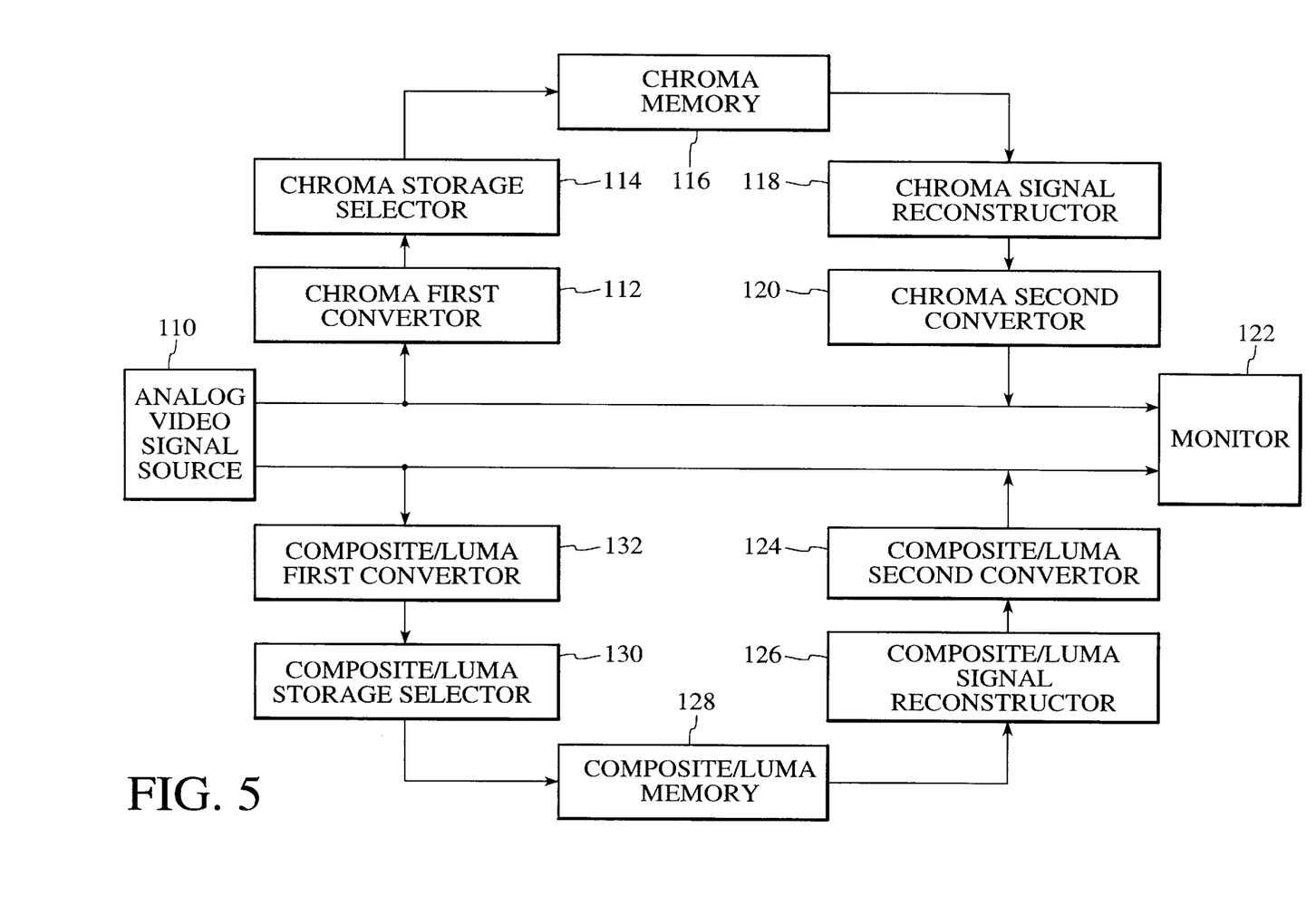
FIG. 5 is a schematic of a composite video and an S-video capture-and-preview system with selective storage capability in accordance with the invention.

When the selective storage embodiments of the invention are implemented, preview of the stored video data requires additional operations. FIG. 3 represents a system, including a signal reconstructor 86, and second convertor 90 and a monitor 94, that can be used for composite video. FIG. 5 represents a system that can be used for composite video and/or S-video. The description of the operation will refer to FIG. 5, although the system in FIG. 3 can be used for composite video.

Referring to FIG. 5, the lower path processes either a composite video signal or the luminance (Y) component of an S-video signal. The upper path, on the other hand, carries the chrominance (C) component of an S-video signal and is set to 0 when the analog signal source 110 is composite video. The composite/luminance first convertor 132 and the chrominance first convertor 112 sample the respective incoming analog signals at 4 $F_{sc}$ using a sub-carrier locked sampling clock and then convert the resulting sample data into raw digitized video data. The composite/luminance storage selector 130 and the chrominance storage selector 114 then selectively store the raw digitized video data using the techniques described above. The composite/luminance samples are stored in memory 128 after discarding all but the active digitized video samples and some digitized video samples required for accurate timing recovery. The stored composite/luminance samples require about 190 kB per field if each sample is digitized to 8-bit precision. The chrominance samples, in the case of S-video, are non-uniformly selected for storage in memory 116. The chrominance samples occupy an additional 46 kB of memory per field. Once the desired video fields have been stored in memory, an analog video signal may be synthesized for previewing any of the fields on a display monitor 122.

If the stored samples correspond to a composite video signal, then the composite/luminance signal reconstructor 126 must perform the following operations. Step 1—synthesize appropriate vertical blanking and vertical synchronization signals for the composite video signal. Step 2—reconstruct each horizontal line of the composite video samples from the samples stored in memory. In this process, the composite/luminance signal reconstructor 126 must synthesize those samples which were discarded during selective storage. The discarded samples correspond to the horizontal blanking intervals and the trailing edge of the horizontal sync pulse, none of which are difficult to synthesize. If no color burst samples were stored, then the color burst samples must also be synthesized, which is a simple matter because sub-carrier locked sampling ensures that the color burst signal is a fixed pattern which repeats every four samples. The reconstructed composite/luminance signal is then converted from digital to analog data in the composite/luminance second convertor 124.

If the stored samples correspond to S-video, then the composite/luminance signal reconstructor 126 and the chrominance signal reconstructor 118 must perform the following operations: Step 1—synthesize appropriate vertical blanking and vertical synchronization signals for the luminance channel. Step 2—reconstruct each horizontal line of luminance samples from the samples stored in memory. In this process, the composite/luminance signal reconstructor 126 must synthesize those samples which were discarded during selective storage. The discarded samples correspond to the horizontal blanking intervals and the trailing edge of the horizontal sync pulse, none of which are difficult to synthesize. If no color burst samples were stored, these must also be synthesized, which is a simple matter because sub-carrier locked sampling ensures that the color burst signal is a fixed pattern which repeats every four samples. The only case in which color burst samples are not stored is when the color sub-carrier is sampled with a phase locked sampling clock. In this situation, color burst samples can be easily synthesized. If the sampling clock is not phase locked, then color burst samples must be stored and the color burst samples can be replayed from memory. However, it is not necessary to store all of the color burst samples. Only a few color burst samples need to be stored, and the remaining samples can be reproduced by repeating the fixed pattern that repeats every four samples. Step 3—interpolate the discarded chrominance channel samples in the chrominance signal reconstructor 118. The full sequence of chrominance samples C[n] are reconstructed by interpolating the baseband I[n] and Q[n] signals and reversing the polarity where appropriate. The recon- structed chrominance signal is then converted from digital to analog data in the chrominance second convertor 120. The chrominance signals can then be delivered directly to an S-video compatible monitor 122 as depicted in FIG. 5 or added to the luminance samples to obtain a true composite video signal suitable for output to a composite video compatible monitor.

When text overlay is applied where digitized video data has been selectively stored, another consideration must be taker) into account for previewing. Prior to software decoding, the exact horizontal timing information from the raw digitized video data is not actually known. Consequently, some uncertainty exists regarding the location of overlay pixels, which may result in jagged text edges. The problem is readily overcome by saving and replacing the captured horizontal sync samples with synthetic sync samples, on all lines which hold overlay text and possibly some of the surrounding lines. In this way, the text overlay algorithm directly controls the horizontal timing of the preview video in the critical regions so that text pixels line up perfectly. One side effect of this approach is that the underlying preview pixels may no longer line up perfectly. Essentially, this solution transfers the jagged edge effect from the overlay text to the underlying preview image wherever the text appears.

Figure 6:
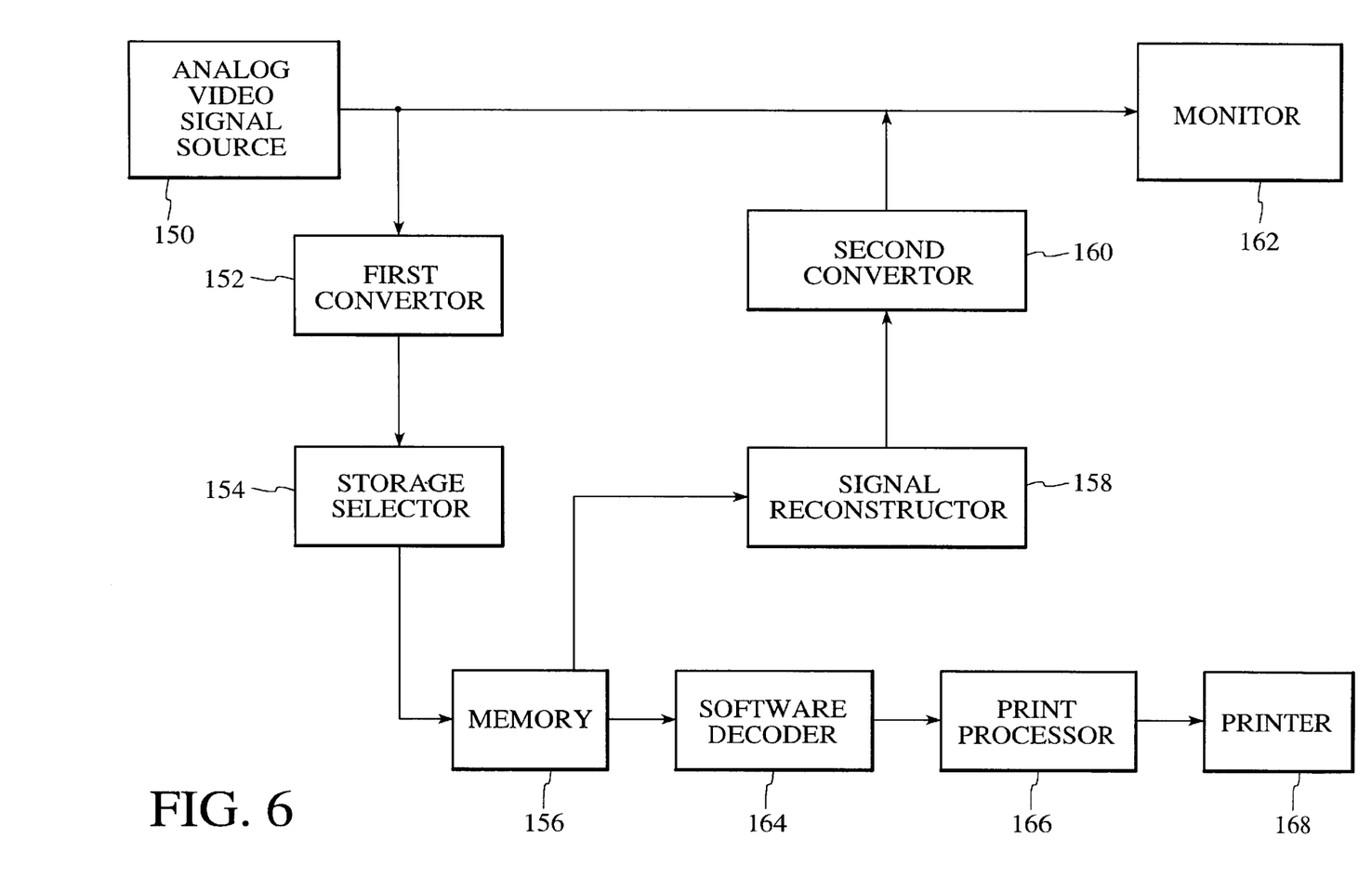
FIG. 6 is a schematic of a video printing system that incorporates the video capture-and-preview system and selective storage in accordance with the invention.

Although the invention may be applied to other fields, in the preferred embodiment, the invention is applied to a video printing system. FIG. 6 is a depiction of a video printing system that incorporates the disclosed invention. In the preferred embodiment, NTSC composite and S-video standards are for the analog video signal source 150. However, the PAL composite and S-video standards could also be used with minor modifications.

Video printing in the preferred embodiment requires three main functions to be performed. The first main function involves converting the analog video signal to raw digitized video data and selectively storing portions of the raw digitized video data. The second main function involves previewing the incoming analog video data without having to convert the incoming analog video data into digital image data. The third main function involves using software to convert selected portions of raw digitized video data into complete digital image data and then processing the digital image data for printing.

The first main function of converting the analog video signal into raw digitized video data and selectively storing portions of the raw digitized video data is carried out in a first convertor 152 and a data storage selector 154. The conversion and storage operations are carried out as described above. Once the conversion and storage operations are complete, the raw digitized video data is stored in memory 156.

The second main function of previewing the incoming analog video data without having to convert the incoming analog video data into digital image data is carried out by a series of devices. Initially, a user watches a video presentation on the preview monitor 162. At the desired point, the user indicates to the video printing system that the user would like to preview a particular image. The raw digitized video data is then retrieved from memory and processed by the signal reconstructor 158, using the techniques outlined above. The reconstructed raw digitized video data is then sent to a second convertor 160 that converts the raw digitized video data into an analog video signal that is then displayed on the monitor 162. The user then can preview the still video image to determine if the user wants to print the still video image. The user may step through multiple fields or frames before deciding what to print.

The third main function, using software to convert selected portions of raw digitized video data into complete digital image data and then processing the digital image data for printing, is accomplished outside of the capture-and-preview system. Once a still video image has been selected for printing, the raw digitized video data is sent to a software decoder 164 and converted into a digital image using conventional software decoding algorithms. The created digital image data is then sent to a print processor 166 to be processed for printing. The print processor uses conventional print processing techniques. Once processed, the image is sent to a printer 168 where a hard copy image is printed.

What is claimed is:

1. A method of previewing video data on a field-by-field basis or frame-by-frame basis comprising the steps of:

converting incoming encoded analog video data having timing, vertical and horizontal information into raw digitized video data, said raw digitized video data representing a plurality of discrete video images, including forming said raw digitized video data for each said discrete video image as a stream of digital samples taken while said incoming encoded analog video data is intact;

storing at least a portion of each said stream of digital samples as a segment of said raw digitized video data in a memory, said memory performing data storage and transfer functions;

converting a selected said segment of raw digitized video data that represents a discrete video image into outgoing analog video data; and delivering said outgoing analog video data to a preview device for display;

wherein said step of converting said selected segment of raw digitized video data into outgoing analog video data includes a step of adjusting timing data embedded within said selected segment of raw digitized video data, said timing data being a component of said raw digitized video data that is necessary for previewing.

2. A method of previewing video data on a field-by-field basis or frame-by-frame basis comprising the steps of:

converting incoming analog video data into raw digitized video data, said raw digitized video data representing a plurality of discrete video images;

storing said raw digitized video data in a memory, said memory performing data storage and transfer functions;

converting a segment of raw digitized video data that represents a discrete video image into outgoing analog video data; and delivering said outgoing analog video data to a preview device for display;

wherein said step of storing said raw digitized video data in a memory is a step of storing only necessary parts of said raw digitized video data and discarding unnecessary parts of said raw digitized video data.

3. The method of claim 2 wherein said step of converting said segment of raw digitized video data into outgoing analog video data further includes the steps of synthesizing said unnecessary parts of said segment of raw digitized video data to produce a synthesized video data and reconstructing said segment of raw digitized video data by combining said necessary parts of said segment of raw digitized video data and said synthesized video data .

4. A method of previewing video data on a field-by-field basis or frame-by-frame basis comprising the steps of:

converting incoming encoded analog video data having vertical and horizontal information into raw digitized video data, said raw digitized video data representing a plurality of discrete video images, including forming said raw digitized video data for each said discrete video image as a stream of digital samples taken while said incoming encoded analog video data is intact;

storing at least a portion of each said stream of said raw digitized video data in a memory, said memory performing data storage and transfer functions;

converting a segment of raw digitized video data that represents a discrete video image into outgoing analog video data; and delivering said outgoing analog video data to a preview device for display;

wherein said step of delivering said outgoing analog video data to said preview device for display further includes the step of overlaying textual information onto said video data that is displayed on said preview device.

5. A method of previewing video data on a field-by-field basis or frame-by-frame basis comprising the steps of:

converting incoming analog video data into raw digitized video data, said raw digitized video data representing a plurality of discrete video images;

storing said raw digitized video data in a memory, said memory performing data storage and transfer functions;

converting a segment of raw digitized video data that represents a discrete video image into outgoing analog video data; and delivering said outgoing analog video data to a preview device for display;

wherein said step of delivering said outgoing analog video data to said preview device for display further includes the step of adjusting the color appearance of said outgoing analog video data.

6. A method of previewing video data on a field-by-field basis or frame-by-frame basis comprising the steps of:

converting incoming analog video data into raw digitized video data, said raw digitized video data representing a plurality of discrete video images;

storing said raw digitized video data in a memory, said memory performing data storage and transfer functions;

converting a segment of raw digitized video data that represents a discrete video image into outgoing analog video data;

delivering said outgoing analog video data to a preview device for display;

decoding said segment of raw digitized video data into digital image data using software, including formatting said digital image data to enable printing; and printing said digitized image data.

7. A system for previewing still images of video data comprising:
- an input connected to receive an incoming analog signal of video data;
- a first conversion means, connected to said input, for converting said incoming analog signal into discrete segments of raw digitized video data;
- a memory connected to receive and store said discrete segments of raw digitized video data in a series of said discrete segments of raw digitized video data;
- a second conversion means, connected to said memory, for forming an outgoing analog signal from a particular discrete segment of raw digitized video data in said series of discrete segments of raw digitized video data, said outgoing analog signal being representative of a still image of said video data from said incoming analog signal; and
- a display device connected to receive and display said outgoing analog signal;
- wherein said incoming analog signal includes color sub-carrier phase data that is necessary for video data previewing and wherein said second conversion means for forming an outgoing analog signal includes a timing control means for adjusting said color sub-carrier phase data to account for color sub-carrier phase advance.

8. A system for previewing still images of video data comprising:
- an input connected to receive an incoming analog signal of video data;
- a first conversion means, connected to said input, for converting said incoming analog signal into discrete segments of raw digitized video data;
- a memory connected to receive and store said discrete segments of raw digitized video data in a series of said discrete segments of raw digitized video data;
- a second conversion means, connected to said memory, for forming an outgoing analog signal from a particular discrete segment of raw digitized video data in said series of discrete segments of raw digitized video data, said outgoing analog signal being representative of a still image of said video data from said incoming analog signal;
- a display device connected to receive and display said outgoing analog signal; and
- a selective storage means for discarding unnecessary portions of said raw digitized video data and storing necessary portions of said raw digitized video data.

9. The system of claim 8 further including a raw digitized data synthesis means for synthesizing said unnecessary portions of raw digitized data to produce a synthesized data in order to replicate said unnecessary portions of raw digitized data.

10. The system of claim 9 further including a raw digitized reconstruction means for creating reconstructed raw digitized video data from said necessary portions of said raw digitized video data and from said synthesized data.

11. A system for previewing still images of video data comprising:
- an input connected to receive an incoming analog signal of video data;
- a first conversion means, connected to said input, for converting said incoming analog signal into discrete segments of raw digitized video data;
- a memory connected to receive and store said discrete segments of raw digitized video data in a series of said discrete segments of raw digitized video data;
- a second conversion means, connected to said memory, for forming an outgoing analog signal from a particular discrete segment of raw digitized video data in said series of discrete segments of raw digitized video data, said outgoing analog signal being representative of a still image of said video data from said incoming analog signal;
- a display device connected to receive and display said outgoing analog signal; and
- a color adjustment means for adjusting the color appearance of said outgoing analog signal.

12. A system for previewing still images of video data comprising:
- an input connected to receive an incoming analog signal of video data;
- a first conversion means, connected to said input, for converting said incoming analog signal into discrete segments of raw digitized video data;
- a memory connected to receive and store said discrete segments of raw digitized video data in a series of said discrete segments of raw digitized video data;
- a second conversion means, connected to said memory, for forming an outgoing analog signal from a particular discrete segment of raw digitized video data in said series of discrete segments of raw digitized video data, said outgoing analog signal being representative of a still image of said video data from said incoming analog signal;
- a display device connected to receive and display said outgoing analog signal;
- a software decoder, connected to said memory, for converting said particular discrete segment of raw digitized video data into digital image data having a format that enables printing; and
- a printer connected to said software decoder for creating a printed image that represents said still image of video data.

13. A video printing system comprising:
- a first convertor, connected to receive an incoming analog video signal, for converting said incoming analog signal into raw digitized video data, said incoming analog signal includes phase data that is necessary for video data previewing;
- a storage selector, connected to said first convertor, for identifying necessary portions and unnecessary portions of said raw digitized video data, and for discarding said unnecessary portions of said raw digitized video data, said necessary portions of said raw digitized data containing image information and unsynthesizable timing information, and said unnecessary portions of said raw digitized data containing synthesizeable timing information;
- a memory, connected to said storage selector, for storing said identified necessary portions of said raw digitized video data;
- a signal re-constructor, connected to said memory, for synthesizing said discarded unnecessary portions of said raw digitized video data and for reconstructing said raw digitized video data from said necessary portions of said raw digitized video data and from said synthesized portions of said unnecessary raw digitized video data;
- a second convertor, connected to said signal re-constructor, for converting said reconstructed raw digitized video data into an outgoing analog video signal, and for adjusting said phase data to account for phase advance;

a monitor, connected to said second convertor, for displaying said outgoing analog video signal;

a software decoder, connected to said memory, for decoding said identified necessary portions of raw digitized video data into digital image data; and a printer, connected to said software decoder, for creating a printed image that represents said decoded digital image data.

* * * * *